United States Patent
Eklund

(10) Patent No.: US 10,373,174 B2
(45) Date of Patent: Aug. 6, 2019

(54) SYSTEM AND METHOD FOR ONLINE CONTENT DELIVERY

(75) Inventor: Andrew Eklund, Roseville, MN (US)

(73) Assignee: LocalScene LLC, Minneapolis, MN (US)

(*) Notice: Subject to any disclaimer, the term of this patent is extended or adjusted under 35 U.S.C. 154(b) by 1143 days.

(21) Appl. No.: 12/356,167

(22) Filed: Jan. 20, 2009

(65) Prior Publication Data

US 2010/0036719 A1 Feb. 11, 2010

Related U.S. Application Data

(60) Provisional application No. 61/087,507, filed on Aug. 8, 2008.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0241* (2013.01); *G06Q 30/0273* (2013.01)

(58) Field of Classification Search
CPC ............. G06Q 30/0273; G06Q 30/0241
USPC ......................................................... 705/14
See application file for complete search history.

(56) References Cited

U.S. PATENT DOCUMENTS

| | | | |
|---|---|---|---|
| 7,039,599 B2* | 5/2006 | Merriman et al. | 705/14.52 |
| 2001/0037205 A1* | 11/2001 | Joao | 705/1 |
| 2002/0055872 A1* | 5/2002 | LaBrie et al. | 705/14 |
| 2002/0072965 A1* | 6/2002 | Merriman et al. | 705/14 |
| 2004/0186778 A1* | 9/2004 | Margiloff et al. | 705/14 |
| 2006/0004628 A1* | 1/2006 | Axe et al. | 705/14 |
| 2008/0010143 A1* | 1/2008 | Kniaz et al. | 705/14 |
| 2008/0021775 A1* | 1/2008 | Lerman et al. | 705/14 |
| 2008/0140502 A1* | 6/2008 | Birnholz | G06Q 30/02 705/14.72 |
| 2012/0232999 A1* | 9/2012 | Roberts et al. | 705/14.66 |

* cited by examiner

*Primary Examiner* — Matthew L Hamilton
(74) *Attorney, Agent, or Firm* — Schwegman Lundberg & Woessner, P.A.

(57) ABSTRACT

Apparatus, systems, and methods for online content delivery are disclosed that operate to present an advertisement to a plurality of users, the advertisement associated with an advertiser and comprising a plurality of software components where at least one software component of the plurality of software components is an interactive software component; track use of the interactive software component by the plurality of users; calculate an aggregate value based on a value associated with each use of the interactive software component; and charge the advertiser an advertising fee corresponding to the aggregate value. Additional apparatus, systems, and methods are disclosed.

14 Claims, 10 Drawing Sheets

ASSIGN BIDS FOR COST PER CONVERSION

| VIDEO | IMAGE | DOWNLOAD |

The quick brown fox jumps over the lazy dog.

| CONVERSION% | COMPONENT NAME | ENTER BID FOR COST PER CONVERSION |
|---|---|---|
| 32.4% | DOWNLOAD WHITEPAPER | $ 1.00 |
| 79.6% | VIDEO PLAYBACK | $ 0.10 |

<< PREV   NEXT >>

*FIG. 9*

SYSTEM AND METHOD FOR ONLINE CONTENT DELIVERY

RELATED PATENT DOCUMENTS

This patent application claims the benefit of priority, under 35 U.S.C. Section 119(e), to U.S. Provisional Patent Application Ser. No. 61/087,507, entitled "SYSTEM AND METHOD FOR ONLINE CONTENT DELIVERY," filed on Jul. 8, 2008, the contents of which are hereby incorporated by reference in their entirety.

BACKGROUND

Advertising is generally based on two factors: exposure and impression. That is, advertisements that are more widely distributed may outperform advertisements with a limited exposure. In addition, advertisements that leave an impression on an audience are generally more valuable than advertisements that are forgettable. In recent years, the use of broad distribution channels, such as television and the Internet, have allowed advertisers to increase the amount of exposure of an advertisement or advertising campaign. In addition, advertisers are given the opportunity to improve the impressions on audiences by providing dynamic, full-featured advertising over increasingly-available high-speed communication networks, such as the Internet.

BRIEF DESCRIPTION OF THE DRAWINGS

Some embodiments are illustrated by way of example and not limitation in the figures of the accompanying drawings in which:

FIGS. 6, 7, 8 and 9 are diagrams illustrating graphical user interfaces, according to example embodiments.

DETAILED DESCRIPTION

Figure 1:
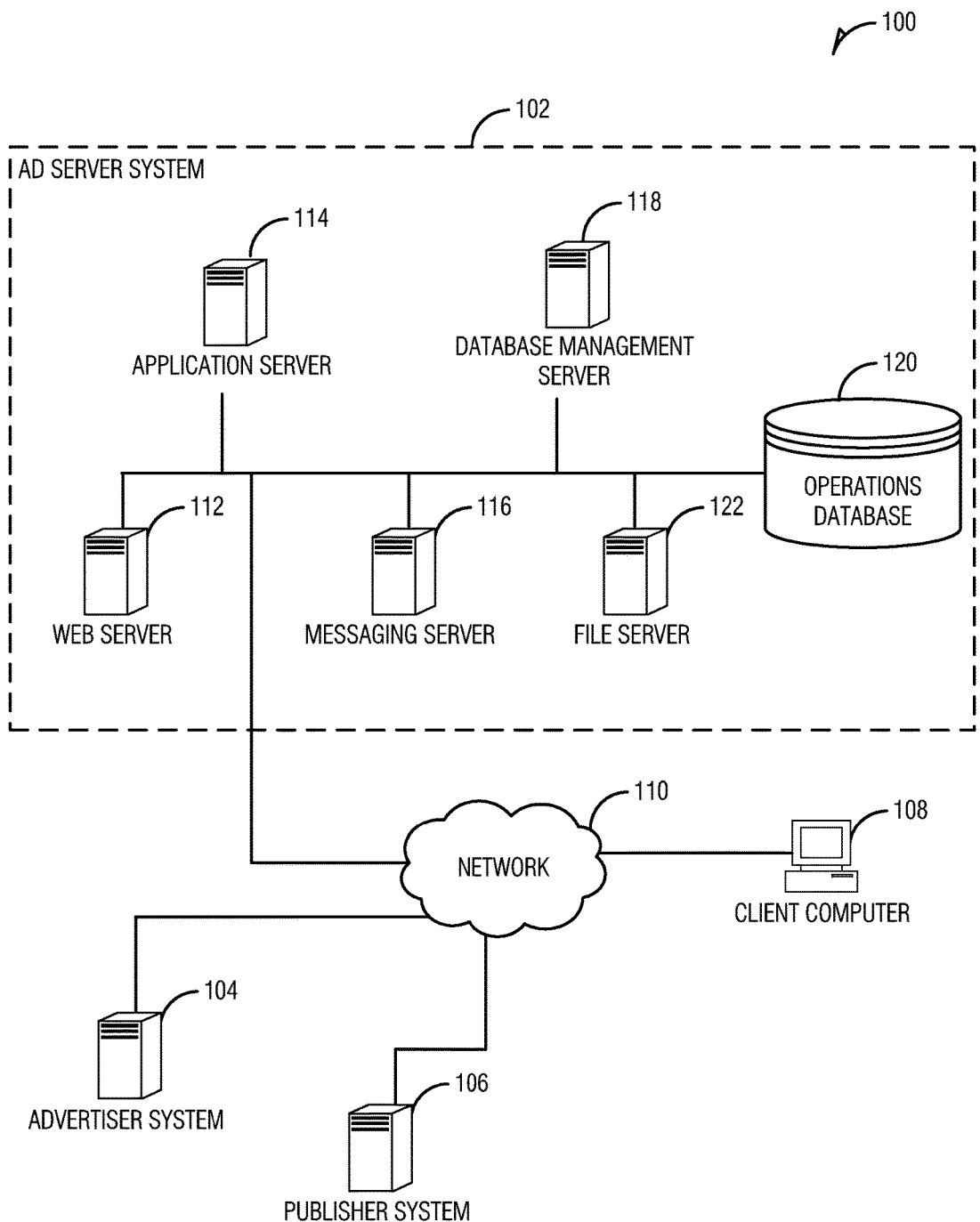
FIG. 1 is a schematic view of a computer network system according to an example embodiment.

Example methods, apparatus, and systems to provide online content delivery are described. In the following description, for purposes of explanation, numerous specific details are set forth in order to provide a thorough understanding of example embodiments. It will be evident, however, to one skilled in the art that embodiments described the present application invention may be practiced without these specific details.

For the purposes of this document, an "advertisement" can include any presentation of words, photographs, video, graphic elements, or other visual elements displayed alone or in combination. Advertisements in a dynamic medium, such as a web page, computerized kiosk, or cellular phone, can also include interactive or programmatic elements, such as widgets, scripts, plug-ins, or other software modules that interact with a person viewing the advertisement. An advertisement can be referred to as an "ad," "promotion," "commercial," "announcement," or other terms that refer to a publication in print, broadcast, or electronic media to advertise a product or service.

A "reservation amount" refers to the base cost to insert an advertisement in a publication. The reservation amount refers to the amount requested by a publisher or an advertiser to "reserve" space in a publication media. The publication media can include print, electronic, or broadcast media.

An "impression" refers to a viewing of the advertisement by a person of an audience. Impressions can be estimated, for example in the case of how many people in a radio audience received the advertisement, or directly measured, for example in the case of an online advertisement using advertisement tracking. Impressions can be measured in thousands, and in some cases advertising costs are structured in relation to the number of impressions, such as $150 per 10,000 impressions.

A "convertible activity" refers to an action performed with respect to the advertisement by the person of the audience. Examples of convertible activities include, but are not limited to, clicking on an online advertisement to cause a navigation operation or other operation, calling a call center to inquire about or order a product being advertised, or submitting information, such as an email address, via the advertisement. Convertible activities can be thought of as actions taken on an advertisement, in the case of interactive media, or actions taken as a direct result of an advertisement. A convertible activity may result in a conversion.

A "conversion" refers to a desired action resulting from a convertible activity. In many instances, the desired action is a sale or other exchange of goods or services for value. The desired action may also include, but is not limited to, ordering a product via the advertisement, a newsletter subscription, an email distribution subscription, a software download, a file download, and a request for access to a restricted document, website, call center, or other information.

A "conversion amount" refers to the cost that an advertiser is charged for each conversion. Similar to impression cost structures, conversion amounts can be structured in relation to the number of conversions, e.g., a conversion amount of $50 per 100 conversions.

A "conversion rate" refers to the number of conversions in view of the number of impressions in a particular time frame. The conversion rate may be expressed as a percentage. Related to the conversion rate is a "cost per conversion," which refers to the advertising cost averaged over a group of one or more conversions.

A "component" may include plug-ins, widgets, or other compartmentalized software components that perform a unitized function. Components may be designed and implemented to work with an application programming interface (API) or an application platform, such as Adobe Flash® from Adobe Incorporated. In addition, components may be designed and implemented to work within a programming language platform, such as the Java Runtime Environment (JRE).

In an example embodiment, advertisers bid for ad placement using a reservation amount and a conversion amount. The conversion amounts may be separately bid on (e.g., an advertiser is willing to pay $0.50 for each click that results in a download and $4.00 for each email submitted to a newsletter subscription). The top bidder is granted placement in the publisher's media (e.g., a website). Publishers may establish a minimum bid amount for either the reservation amount and/or the conversion amount. The minimum conversion amount may be based on a total expected conversion amount over one or more components, an average expected conversion amount over several components, or a minimum designated per component.

In an example embodiment, advertisements are based on templates that have one or more components. The components may be basic ones, such as a text component, or more complex ones, such as streaming media or a live chat interface. The arrangements of the components are recorded with respect to each template. As advertisements are run, the performance of the advertisements is tracked. Advertisements that are higher performing are identified, and the corresponding templates are then recommended to later advertisers looking to optimize their advertising performance. The feedback loop may take many factors into consideration, such as product, product genre, price points, market context, target market, advertising media, placement, run time, etc., when developing a recommendation of which template is "best" for the potential new advertiser.

In an example embodiment, during advertisement creation, an advertiser is presented with a template and the corresponding one or more components in a user-interface. When choosing a template, the advertiser is presented with a statistic indicating the effectiveness of each template. The statistic may be a conversion rate presented as a percentage (e.g., how many people performed a conversion activity with respect to how many people saw the ad). After choosing a template, the user is then presented with the components used in the selected template. With each component, the advertiser is presented with a statistic indicating how effective the component is when used in the corresponding template. Again, the statistic may be a conversion percentage indicating the percentage of people that interacted with the component in view of the number of people who were presented with the component.

In an example embodiment, advertisements placed using the above-described systems are tracked. Ad revenue is collected from the advertiser based on conversions, reservation costs, impressions, and the like. The ad revenue is then distributed amongst the publisher (the one who published the advertisement), the provider (a central system that brought the advertiser and the publisher together), and possibly the people/entities that developed the template used to create the advertisement. The ad revenue is based on the bid-based conversion amounts and reservation amounts. Thus, each convertible action (e.g., clicking to download a file) is separately tracked to provide an accurate and complete picture of ad revenue.

Platform Architecture

FIG. 1 is a schematic view of a computer network system 100 according to an example embodiment. The computer network system 100 includes an ad server system 102, an advertiser system 104, a publisher system 106, and a client computer 108, all communicatively coupled via a network 110.

The ad server system 102 is used as a centralized system to provide a framework for advertising distribution, record keeping, reporting, and advertising campaign management. Advertisers may interface with the ad server system 102 to create new advertising campaigns or manage existing ones. An advertising campaign may include one or more advertisements usually with a common theme, directive, target audience, or time frame. Aspects of managing a campaign include creating new advertisements, organizing advertisements within a campaign, and managing spending (e.g., bidding, budget management, or other expenses).

Publishers may interface with the ad server system 102 to select advertisements for their media. The publishers may then use the ad server system 102 to have the selected advertisements served to their system (e.g., publisher system 106). For example, in an online context, a publisher may select one or more advertisements to display on the publisher's website. When users visit the website home page, the advertisements are retrieved from the ad server system 102 and presented. As users interact with the advertisement, these actions may be captured and communicated to the ad server system 102 for billing, performance tracking, or other record-keeping activities. In addition, a publisher may integrate the ad server system 102 with an advertisement delivery platform established or managed by the publisher. In this manner, the publisher may use the ad server system 102 for content delivery, campaign management, advertisement tracking, or other features, while also using a delivery mechanism of their choice. Examples of advertisement delivery platforms include, but are not limited to, Double-Click® of New York, N.Y. (including DART®) and 24/7 Real Media, a WPP Company, of New York, N.Y.

Developers may also interface with the ad server system 102. Developers may develop advertising templates or other content used in an advertisement. Advertisement templates and advertising content may be developed by separate developers. The ad server system 102 provides mechanisms for each type of developer to interact independent from the other. Advertisement templates provide the layout of an advertisement, which is separately important from the content populating the layout. For a successful advertisement, both the layout and the content are important, and as such, in an example embodiment, the template developer and the content developer are provided distinct interfaces to manage their contributions. The ad server system 102 may provide a framework for a developer to create, revise, upload, or otherwise manage one or more advertisement templates. The ad server system 102 may also be configured to distribute royalties or other payments to developers based on the use of their templates, performance of their templates, or other licensing arrangements.

To provide interfaces for the advertisers, publishers, and developers, one or more application programming interfaces (API) may be used. Using an API may be utilized to encourage $3^{rd}$ party development of tools to use in conjunction with the ad server system 102.

The ad server system 102 includes a web server 112, an application server 114, a messaging server 116, a database management server 118, which is used to manage at least an operations database 120, and a file server 122. The ad server system 102 may be implemented as a distributed system; for example, one or more elements of the ad server system 102 may be located across a wide-area network from other elements of the ad server system 102.

The web server 112 may communicate with the file server 122 to publish or serve files stored on the file server 122. The web server 112 may also communicate or interface with the application server 114 to enable web-based presentation of information. For example, the application server 114 may consist of scripts, applications, or library files that provide primary or auxiliary functionality to the ad server system 200 (e.g., multimedia, file transfer, or dynamic interface functions). In addition, the application server 114 may also provide some or the entire interface for the web server 112 to communicate with one or more of the other servers in the ad server system 102, e.g., the messaging server 116 or the database management server 118.

The messaging server 116 may include an email system, voice system, or other communication system. Using the messaging server 116, the ad server system 102 may provide reports to the advertiser system 104, publisher system 106, or other users (e.g., developers, content creators) via the client computer 108. In addition, the messaging server 116 may be used to distribute billing invoices, reminders, notices, or other messages related to an advertisement campaign. In addition, the messaging server 116 may include software that provides a discussion forum, web log, chat board, or other virtual place for users to communicate with one another, submit support questions, view development or release notes, view system maintenance notices, etc. The messaging server 116 may also include a voice-over-IP subsystem to allow users to interact with customer service agents, advertising consultants, billing or account managers, or other personnel at the ad server system 102.

The operations database 120 may include data to administer, track, audit, and provide reports on data associated with an advertisement or an advertising campaign. For example, the operations database 120 may be structured to include some or all of the following information: an advertisement ID, a publisher ID, an advertisement description, an advertisement type, an advertisement template ID, along with other information to describe the advertisement, advertisement campaign, publisher, advertiser, developer, revenue distribution, etc. The operations database 120 may be implemented as a relational database, a centralized database, a distributed database, an object-oriented database, or a flat database in various embodiments. It is appreciated that other database formats and organizations may be used to implement the systems and methods described herein.

The advertiser system 104 may include a personal computer, terminal computer, a laptop computer, portable computer, personal digital assistant (PDA), mobile telephone (e.g., cellular telephone), desktop computer, or other specialized computing device (e.g., a kiosk), in various embodiments. The advertiser system 104 may also include any number of these types of devices, networked together, to form a communication network. A user may use the advertiser system 104 to create and manage advertisements or advertising campaigns hosted by the ad server system 102.

Similar to the advertiser system 104, the publisher system 106 may include a personal computer, terminal computer, a laptop computer, portable computer, personal digital assistant (PDA), mobile telephone (e.g., cellular telephone), desktop computer, or other specialized computing device (e.g., a kiosk), in various embodiments. The publisher system 106 may also include any number of these types of devices, networked together, to form a communication network. The publisher system 106 may include a management subsystem and a presentation subsystem. The management subsystem can be used to interface with the ad server system 102, while the presentation subsystem can be used to display advertising and other content to an audience.

A developer (not shown) may use a client computer 108 to connect and interface with one or more systems via the network 110. The client computer 108 may include a laptop computer, portable computer, personal digital assistant (PDA), mobile telephone (e.g., cellular telephone), desktop computer, or other specialized computing device (e.g., a kiosk). The client computer 108 may include one or more processors, which, when acting in concert with memory, display drivers, storage devices, input devices, and other components of the client computer 108, form a processing system. The processing system may be configured to present a user interface to the user; receive input from the user; search, compute, aggregate, or otherwise process the input; and provide an output to the user. The client computer 108 may interface with the systems described using a standardized protocol or a proprietary protocol to communicate in a secured or unsecured manner over the network 110. For example, the client computer 108 may connect with various systems, such as the ad server system 102, the advertiser system 104, or the publisher system 106, using Secure Hypertext Transfer Protocol (HTTPS) over a Transmission Control Protocol/Internet Protocol (TCP/IP) network. As another example, the client computer 108 may connect with systems using a virtual private network (VPN).

The network 110 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 110 may include a single LAN or WAN, or combinations of LAN's or WAN's, such as the Internet. The various devices and systems coupled to the network 110 may be coupled to the network 110 via one or more wired or wireless connections.

In an embodiment, a user (not shown) at a client computer 108 may interface with the ad server system 102, such as by using the web server 112, to sign-in and manage content. For example, the user may be a template designer or developer. The user may create an advertisement template and upload the advertisement template to ad server system 102 to be stored in the operations database 120. The advertisement template may be created using the ad server system 102. For example, the ad server system 102 may provide a user-interface to design, store, and share advertisement templates. The advertisement template may also be designed and created without the use of the ad server system 102. For example, a standalone software application may be used at the client computer 108 to create an advertisement template. After developing the advertisement template, the user may use the software application to connect with the ad server system 102 and upload the advertisement template. The software application may use an API to interface with the ad server system 102. In an example embodiment, the advertisement template is described using a standardized formatting language, such as extensible markup language (XML) or hypertext markup language (HTML).

Figure 2:
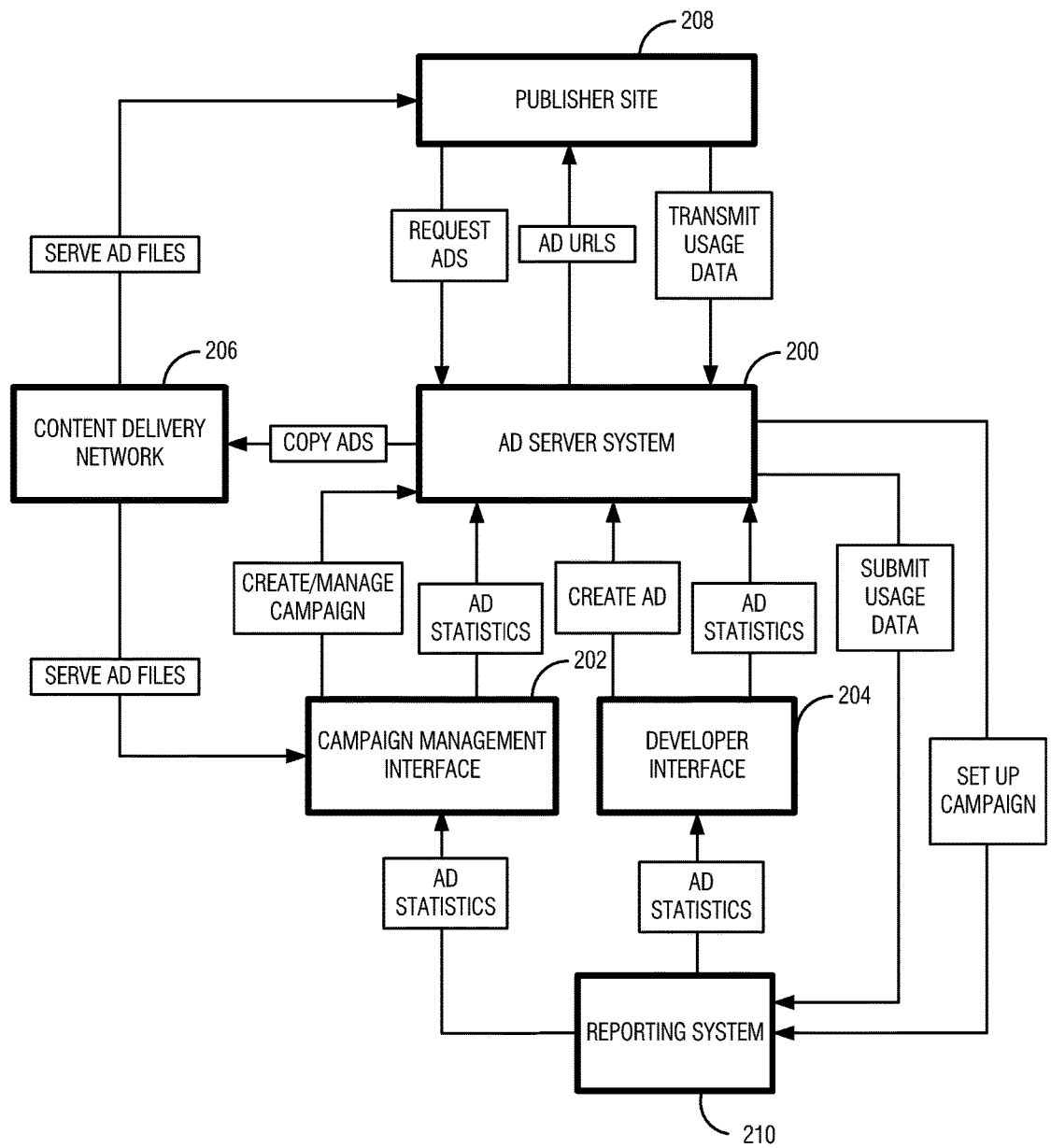
FIG. 2 is a block diagram illustrating functional components of an advertising distribution network according to an example embodiment.

FIG. 2 is a block diagram illustrating functional components of an advertising distribution network according to an example embodiment. Illustrated in FIG. 2 are an ad server system 200, a campaign management interface 202, a developer interface 204, a content delivery network 206, a publisher site 208, and a reporting system 210.

An ad server system 200 acts as the central processor of the network and performs actions supporting one or more of the following four responsibilities:

Provide ad units (advertisements) to publisher sites upon request

Track usage data for invoicing and administration

Manage campaigns created by advertisers

Manage ad unit templates provided by developers

In an example embodiment, the ad server system 200 includes a web application and a database. The web application and the database may be used to implement the campaign management interface 202 or the developer interface 204.

In an example embodiment, a user (not shown) may use the campaign management interface 202 to create or manage an advertising campaign at the ad server system 200. For example, the user may create an advertisement by uploading copy, images, video, sound files, or other content to construct the advertisement. The user may then associate the advertisement with an advertising campaign. The campaign management interface 202 provides the user an interface to create, edit, or manage advertisements and advertising campaigns.

The campaign management interface 202 may allow the advertiser to manage both accounts and campaigns. The advertiser's account may include company and billing information. Campaign management may include the ability to create and edit a campaign (e.g., a group of ads running for a period of time), select an ad type, upload ad content to fill an advertisement template, target ads, and manage the spend (e.g., bidding/budget management per pre-defined costs).

The developer interface 204 allows ad unit developers to create and upload ad templates, define cost per conversion, and define conversions available in the template and setup billing information.

The developer interface 204 may be used by an advertisement content developer, an advertisement template developer, or an advertisement component developer, in various embodiments. In general, the developer interface 204 may allow advertisement developers to create and upload advertisement templates, define cost per conversion, define conversions available in the template, and setup billing information.

An advertisement content developer may access the ad server system 200 to create an advertisement. The advertisement may include content available at the ad server system 200 (e.g., stock content). In addition, the advertisement may include content that the advertisement content developer creates separate from the ad server system 200. For example, the advertisement developer may create an image file using an image editor, a video using a multimedia editor, and copy for the advertisement. Then, using the developer interface 204, the advertisement developer may upload the content and associate it with the advertisement.

As another example, the developer interface 204 may be used by an advertisement template developer to develop an advertisement template.

An advertisement template is designed to perform at least one of the following three functions:

Provide an interface in which the end-user can interact with and consume advertising and/or conduct advertising transactions;

Display advertising content in the template related to the advertiser conducting the campaign as returned by the ad server; and Report performance and usage data to the reporting system per pre-defined conversion information, which may be set up by the template developer.

Advertisement template developers are responsible for architecting and constructing the interface and may use one or more APIs provided by the ad server system 200 to manage campaign data and submit reporting data. The APIs may include web interface-based tools or more sophisticated client-server programs. An advertisement template includes an advertisement layout. An advertisement template may be designed to be appealing to an audience and provide a favorable user interaction. As such, many aspects of an advertisement template are configurable. For example, an advertisement template may include properties related to a background, borders, fonts, or one or more components.

Components may include plug-ins, widgets, or other compartmentalized software components that perform a unitized function. For example, where one video playback component may include playback controls at the top of a window frame interface, another video playback component may provide playback controls that are transparent or translucent until a user hovers a cursor over the playback window frame. Use of the first version may be preferable for design or marketing considerations, such as when considering the amount of space available in the target window interface, whereas use of the second version may be preferable for its simplicity of design. Other examples of components include, but are not limited to, components to display an image, capture an email address, initiate an electronic download, and navigate to an online destination. In addition, components may be quite specific in their function, such as, for example, a component to check the availability of or reserve a hotel room, check the availability of or reserve a dinner table, display a restaurant menu, place an order for a good or service, track a delivery, display the weather forecast, present a stock ticker, or even provide live video or audio from an Internet feed.

As another example, the developer interface 204 may be used by an advertisement component developer to create, upload, or manage components, such as those previously described. By allowing multiple content developers to interact, the ad server system 200 acts as a meeting place for various parties to congregate and interact. In an example embodiment, when an advertiser uses an advertisement template, which contains one or more advertisement components, the advertiser may recompense the advertisement template developer and the advertisement component developer. In this manner, competition is created amongst advertisement template developers and amongst advertisement component developers, which may result in more effective advertising for the advertiser.

When an advertisement is created and ready to be placed in circulation, the advertisement is copied to a content delivery network 206. In an example embodiment, the content delivery network 206 is a component of the ad server system 200. For example, the content delivery network may include the database management server 118, operations database 120, and application server 114 as illustrated in FIG. 1. In another example embodiment, the content delivery network 206 is a separate network system that is used primarily to store and distribute advertisements and advertising content.

The content delivery network 206 is available to serve advertisement files to the campaign management interface 202 for use when managing a campaign of advertisements, or to the publisher site, for presentation to an audience. The content delivery network 206 may be configured as a number of distributed store-and-forward systems. For example, to increase advertising delivery speed over the Internet, advertisements may be stored at regional systems, such that, when requested by a client computer in a region, the associated regional system is available to forward the advertisement to the client. This type of distributed storage can reduce the latency of content delivery. In addition, the content delivery network may comprise telecommunication, data communication, or other types of networks to deliver advertisement content to a person. The person may receive and view the advertisement content using various mechanisms, such as a computer, a handheld device, a cellular phone, a smart phone, a television, or other electronic device capable of presenting the advertisement and interfacing with the person in an interactive manner.

The publisher site 208 may request advertisements that the publisher has selected to present. Advertisement locations, such as uniform resource locators (URLs) may be provided in response to the request. When an advertisement is presented, the URLs may be used to fetch the advertisement or advertisement content from the content delivery network 206. Various usage data may then be transmitted to the ad server system 200. The usage data may include information related to the user's interaction with a particular advertisement. Usage data may include when a user interacted with an advertisement, what action was taken during the interaction, which components were used, how many times the components were used, where the advertisement was placed on the website, etc.

In an example embodiment, the publisher site 208 interfaces with the ad server system 200 to obtain a list of ads through a JavaScript embed snippet of code. The snippet may include a publisher ID to be used to request a list of ads based on the number and types of ad locations that are to be filled and the content and localization data of the site. The ad server system 200 may return a list of ads using XML that contain position information, thumbnail information, ad template URLs, media asset URLs, and ad or campaign identification. The publisher site 208 may then display the returned number of ad thumbnails for the end-user to interact with. Upon interaction, the ad template is loaded and usage and performance data is transmitted to the reporting system 210 based on the rules defined in the ad template.

In an example embodiment, the JavaScript snippet for the publisher may resemble:

```
<script language="JavaScript"
src=http://adserver.com/publishersiteid/location/
numberofadlocationsavailable/adtypes/type="text/
javascript"></ script>
```

The usage data is collected at the ad server system 200 and then transmitted to the reporting system 210. The reporting system 210 is responsible for providing usage and performance statistics of the ads and campaigns. The information provided by the reporting system 210 may be used to invoice advertisers, pay publishers and developers, and inform advertisers about the efficacy of advertisements or advertisement components.

The ad server system 200 may expose a reporting API that advertisement developers may use when constructing templates. The API may have a tracking method that submits at least the following information to the reporting system:

Publisher site—this may be expressed as a Uniform Resource Locator (URL) address.
Location on publisher site—this may be expressed as a URL. It may also be expressed using a descriptive comment, such as "Front Page," "Persistent Banner" or "Left Navigation Area."
Advertisement identifier—this may be a unique identifier to track the advertisement.
Campaign identifier
User identifier
Action type—this may be expressed as a behavior or a conversion, where a behavior includes things such as browsing history, purchase history, past product inquiries, or the like. Conversions include convertible activities or conversions.
Action name—this refers to the name of the conversion or behavior.

The ad server system 200 may provide reports, such as the following:
Monthly cost per campaign
Monthly cost per ad
Conversions per ad
Conversion types per ad template
Behaviors per ad
Behavior types per ad template The reporting system 210 may include a communication system, such as messaging server 116 in FIG. 1. Using data from the ad server system 200 identifying ad campaigns, the reporting system 210 may correlate the usage data and report it to the campaign management interface 202 and the developer interface 204. The advertiser may then view the usage data in the campaign management interface 202 to make decisions regarding presently running or future advertising campaigns. Similarly, advertising content developers can use the usage data in an effort to further increase the efficacy of the advertisement templates, advertisement components, or advertisement content.

Figure 3:
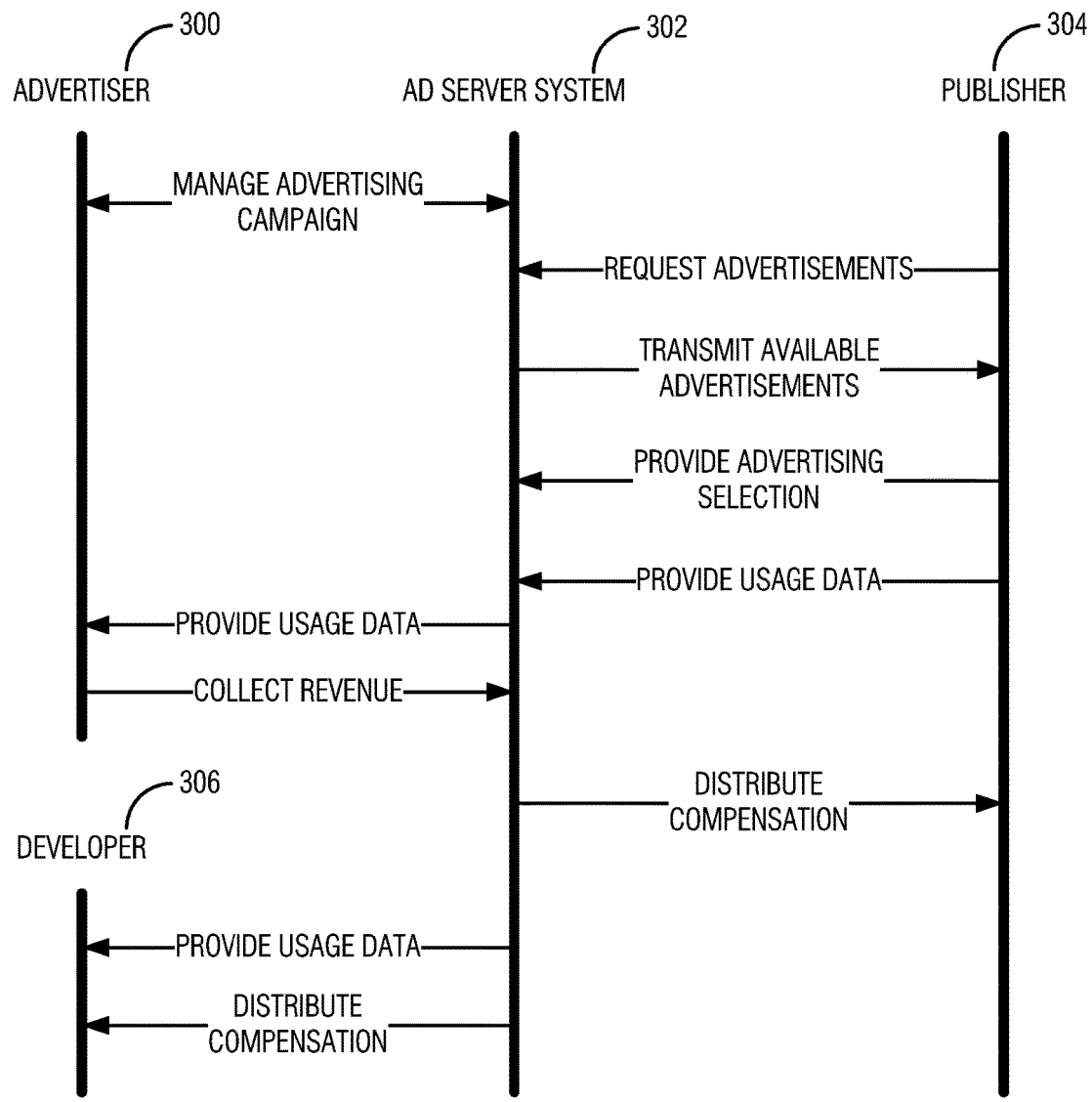
FIG. 3 is a diagram illustrating the transactional relationships between an advertiser, an ad server system, a publisher, and a developer, according to an example embodiment.

FIG. 3 is a diagram illustrating the transactional relationships between an advertiser 300, an ad server system 302, a publisher 304, and a developer 306, according to an example embodiment. The advertiser 300 can interact with the ad server system 302 to manage an advertising campaign. At a later time, the publisher 304 can request advertisements from the ad server system 302. In response, the ad server system 302 can transmit the available advertisements to the publisher 304. The available advertisements may be those that include bids for convertible actions over a certain threshold amount, as established by the publisher 304. The available advertisements may also include advertisements that do not satisfy a publisher's criteria, to allow the publisher to view every advertisement available at the ad server system 302. The publisher 304 can then provide an advertising selection by selecting one or more advertisements which can be presented on the publisher's web site. As selected advertisements are presented to users, usage data is provided to the ad server system 302. The ad server system 302 can then provide the usage data to the advertiser 300 and developer 306. In addition, based on the usage data, the ad server system 302 can calculate advertising costs, collect revenue from the advertiser, and distribute compensation to the publisher 304 or the developer 306.

Flowcharts

Figure 4:
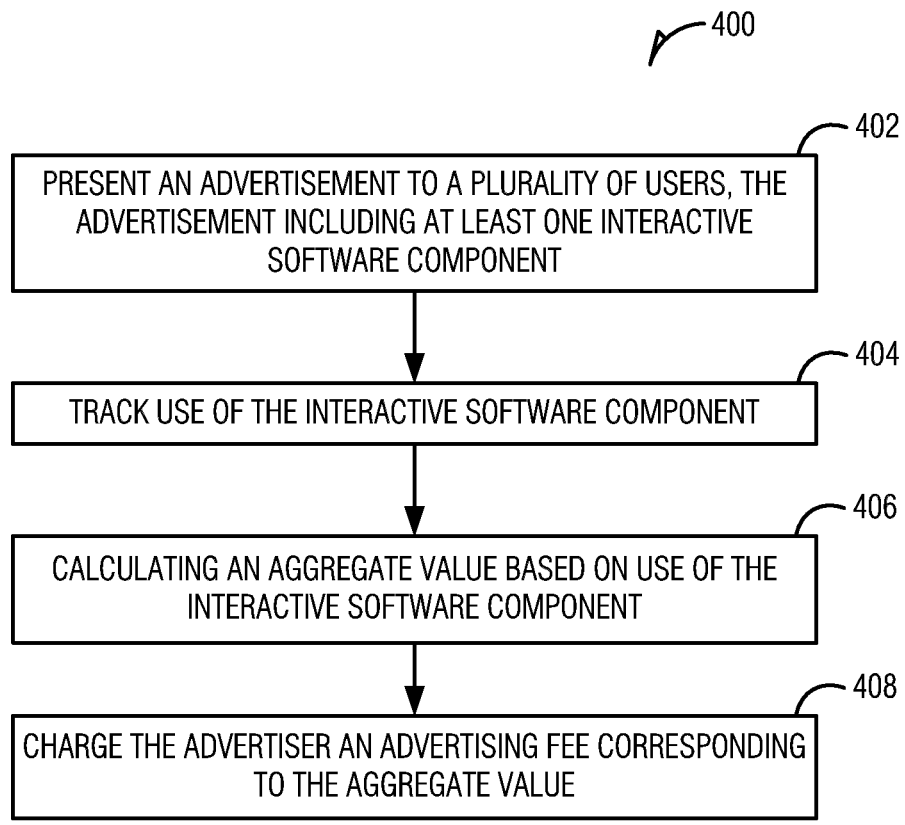
FIG. 4 is a flow chart illustrating a method, according to an example embodiment, to manage advertising.

FIG. 4 is a flow chart illustrating a method 400, according to an example embodiment, to manage advertising. At 402, an advertisement is presented to a plurality of users. In an example embodiment, the advertisement is associated with an advertiser and comprises a plurality of software components where at least one software component of the plurality of software components is an interactive software component. In an example embodiment, the plurality of software components comprises a plurality of interactive software components each with a different value associated with a use of a particular interactive software component.

In an example embodiment, the advertisement is presented with an identifying indicium. The identifying indicium may be a brand mark or brand symbol to provide consumer recognition. The identifying indicium may be a logo, an icon, a text mark, or any other visual indicia used to indicate the source or type of advertisement. For example, when a viewer sees a particular symbol or mark, the viewer may understand that the symbol or mark indicates that there is one or more interactive components available associated with the advertisement. As such, when viewers scan advertisements on a web page, for example, their eyes may be drawn to recognized marks that indicate the availability of interactive components that provide additional functionality. This type of recognition assists the advertiser in delivering advertising and assists the viewer in identifying interesting and useful advertising. The identifying indicium may also be found in the arrangement of the advertisement or advertising components, such as the layout, background, or borders used in advertisement. For example, using a distinctive border pattern, an advertiser may provide an indication of a source of services (e.g., the availability of interactive components).

At 404, the use of the interactive software component by the plurality of users is tracked. Using the advertisement may take one of several forms including, but not limited to, playing a video via the advertisement, initiating a file download via the advertisement, and providing contact information via the advertisement. When the interactive software component is used, the method 400 may record the use, for example in a database. The use may then be referred to later to calculate or estimate advertising effectiveness, advertising revenue, advertising cost, or the like.

In an example embodiment, the use of the interactive software component includes receiving a user command from a user from the plurality of users. The user command may comprise a command to begin playback of a video related to the advertisement, in an example embodiment. The use of the advertisement may then also include presenting the video to the user.

In an example embodiment, the use of the interactive software component includes receiving a request to download a file from a user and then, in response, initiating a download of the file.

In an example embodiment, the use of the interactive software component includes receiving contact information from a user and using the contact information to subscribe the user to an information feed. The contact information may be in various forms, such as an email address, a chat handle, a cellular phone number, a name and address, an Internet Relay Chat (IRC) channel or address, or other identifying information used to send communications to the user.

At 406, an aggregate value based on a value associated with each use of the interactive software component is calculated. The aggregate value is calculated over a time period, such as a day, week, or month. The aggregate value is an indication of how much activity a particular advertisement or advertising component received during the time period. The aggregate value may be calculated by identifying the bid for a use of the interactive software component and determining the number of uses over the time period; multiplying the two values provides the aggregate value.

At 408, the advertiser is charged an advertising fee corresponding to the aggregate value. The advertising fee may include other charges in addition to the aggregate value, such as a reservation cost, a maintenance fee, or other fees or costs.

In a further embodiment, the cost of advertising is determined. The cost may be a function of several factors, including a reservation rate and one or more conversion rates. For example, an ad server system may compile a monthly invoice based on the interactions of an online advertisement in the previous month. The interactions may include convertible activities, with each convertible activity having a value. The value may have been set by an auction process between the advertiser and the publisher. After reviewing usage logs, the ad server system may compute the number and type of convertible activities for each relevant advertisement. Then, using accounting practices, the ad server system may invoice the advertiser the appropriate amount.

The advertising revenue is then collected. In the illustrated embodiment, advertising revenue is collected at a central agency (e.g., the ad server system). In another embodiment, advertising revenue may be distributed by the advertiser to each of the parties that take a share (e.g., the ad server system, the publisher, the developer). In other embodiments, the advertising revenue is collected by another party, such as a collection agency, a bank, or other financial institution, and then distributed to the parties as appropriate.

The advertising revenue is then distributed. For example, using previously established agreements (e.g., licensing contracts, advertising agreement), the ad server system may distribute a portion of the advertising revenue to the publisher or the developer. Advertising revenue may be distributed based on a default scheme, such as 80% to the publisher, 10% to the developer, and 10% to the service provider (e.g., the ad server system 302 in FIG. 3).

Figure 5:
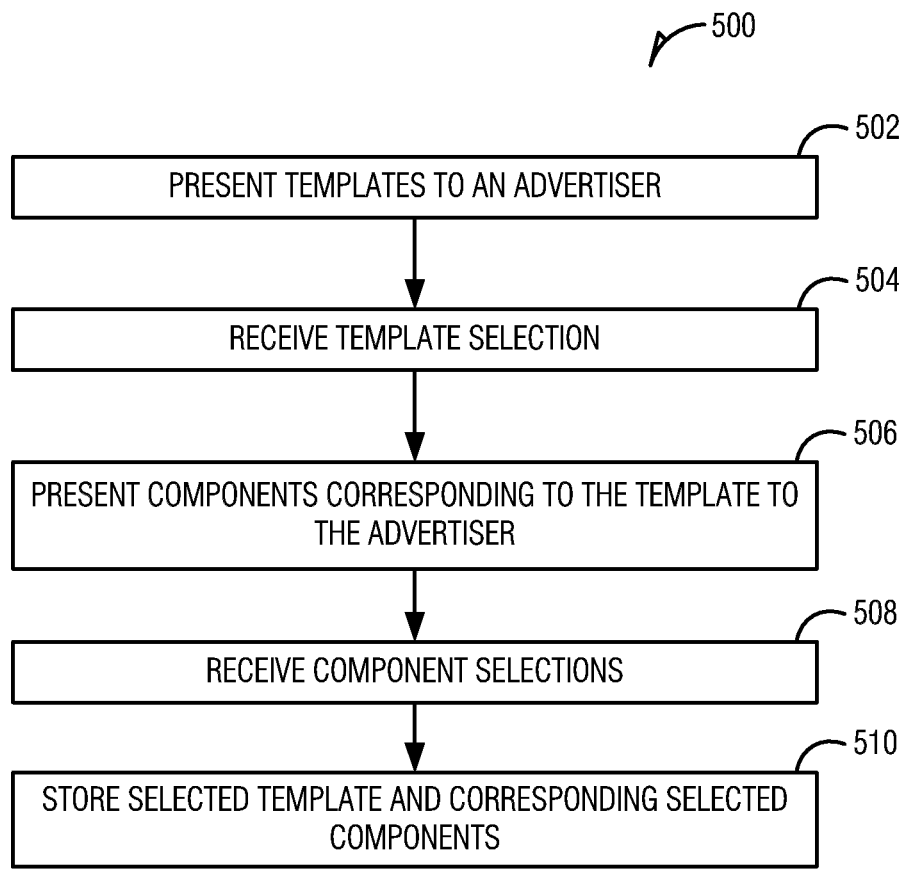
FIG. 5 is a flow chart illustrating a method, according to an example embodiment, to construct an advertisement.

FIG. 5 is a flow chart illustrating a method 500, according to an example embodiment, to construct an advertisement. At 502, one or more advertisement templates are presented to an advertiser user. The advertisement templates may describe the arrangement of one or more components within an advertisement. As such, an advertisement template acts as a layout for an advertisement. The advertisement templates may be defined using a standardized formatting language, such as XML.

At 504, a template selection is received. The selection may be based on metrics presented to the advertising user. Metrics may include measurements such as the number of interactions of a template over a period of time (e.g., the template's lifetime), a conversion percentage, a number of impressions of a template, a creation date of the template, a modification date of the template, or other information to indicate the usage or efficacy of a template. These metrics are described in further detail below with respect to FIGS. 6-9.

At 506, one or more components are presented to the advertiser. The components that are presented include at least those components that are a part of the selected advertisement template. Additional components may be presented, for example, to provide the advertiser user an opportunity to add additional components to the selected advertisement template. In such an embodiment, customization of an advertisement template is tracked so that performance metrics are suitably adjusted in light of any modifications to an advertisement template. Components may be static (e.g., a copy component) or interactive (e.g., a video component).

At 508, the selected components are received. The components are associated with the selected advertisement template.

At 510, the advertisement template and the corresponding selected components are stored. Relationships between a component and a template may be stored in a data structure, which may be centralized or distributed. For example, a central relational database may store the advertisement layout of the selected components. In such a configuration, when an advertisement is served, the layout is first retrieved from the central relational database and then provided to a web browser software application to arrange the components as described by the relationships. As another example, a standardized interface language, such as XML, may be used to store the relationship. For example, in an XML document describing the advertisement template, one or more elements, attributes, or tags are used to store the components and their arrangement in the advertisement layout.

In a further embodiment, the method 500 includes receiving a configuration of the selected advertising template. The configuration of the selected advertising template may include aspects such as the layout of components, the background color or image used, border styles for the windows or frames in the advertisement, transition effects used when changing from a compact or imploded view to a full or exploded view, or other behavioral or visual effects.

In a further embodiment, the method 500 includes receiving a configuration of the selected advertising components. Configuration of advertising components may include aspects such as enabling or disabling interactive controls, specifying a target for a download or a navigation action, providing the text for a copy component, providing the source video for a video component, or the like. Advertising component configuration may be controlled by the component itself. For example, a component designer may provide one or more configurable aspects of a particular component such that when a user actives a configuration mode of a component, the configurable aspects become available for customization.

Using a video component for an illustrative example, a video component designer may provide three alternatives for placement of the playback controls: at the bottom of the component frame, at the right side of the component frame, or as a translucent overlay in the middle of the component frame. The designer may designate a default selection, for example, placing the playback controls at the bottom of the component frame. When a user wants to configure the video component, a user interface may be provided to select the placement of the playback controls. For example, the user may use a mouse input device and right-click on the video component, thereby activating a contextual menu that displays configuration options including options for playback control placement. After the user selects a particular placement of the playback controls and saves the configuration, the configuration is stored in accordance with block 510.

In a further embodiment, the method 500 includes presenting a historical performance to a user during an advertisement template selection or an advertisement component selection. The historical performance may be used by the user to estimate the efficacy of the advertising template or component, which may affect the amount the user is willing to bid on the use of the advertisement or advertising components. The historical performance may use various statistical and mathematical methods to aggregate an advertisement template or an advertisement component's efficacy over a period of time.

In a further embodiment, the method 500 includes receiving a bid related to at least one of a convertible activity with respect to the advertisement or a reservation cost. The bid may be composed of several components, such as a bid for an advertisement reservation and a bid for each convertible activity. An advertisement reservation bid is an amount of money that an advertiser is willing to pay to ensure that space is available on the publisher's media (e.g., website). In addition, the bid may include one or more bids for convertible activities. For example, an advertiser may indicate that for a particular user action that submits an email address to register for a newsletter provided by the advertiser, the advertiser is willing to pay $1.50, and for each time a viewing user clicks a video component in the advertisement to play a video promoting the advertiser, the advertiser is willing to pay $0.20.

The validity of the bid may be checked. In an example, a publisher may establish minimum bidding amounts for either the reservation rate or the conversion rate(s). Thus, part of checking a bid's validity may include comparing the bid amount against a publisher's set minimum amounts and declaring the bid invalid if the bid fails to meet the minimum amount. Another aspect of checking a bid's validity may include a constraint check or "sanity check." For example, a bid that indicates an advertiser is willing to pay $400 for each video playback may be flagged as an invalid bid because it could result in a much higher than normal cost to the advertiser. In such a situation, the bid may be considered an attempt at fraud or simply a mis-keyed entry.

The bid may be then compared with existing bids. If the bid is below existing bids, then it is recorded. The unsuccessful bid may be reported to the advertising user. If the bid is above the existing bids, then that status is noted and may be reported. The bid status may be provided to the bidder (e.g., the advertiser user).

User Interfaces

FIGS. 6-9 are diagrams illustrating a graphical user interface, according to example embodiments.

Figure 6:
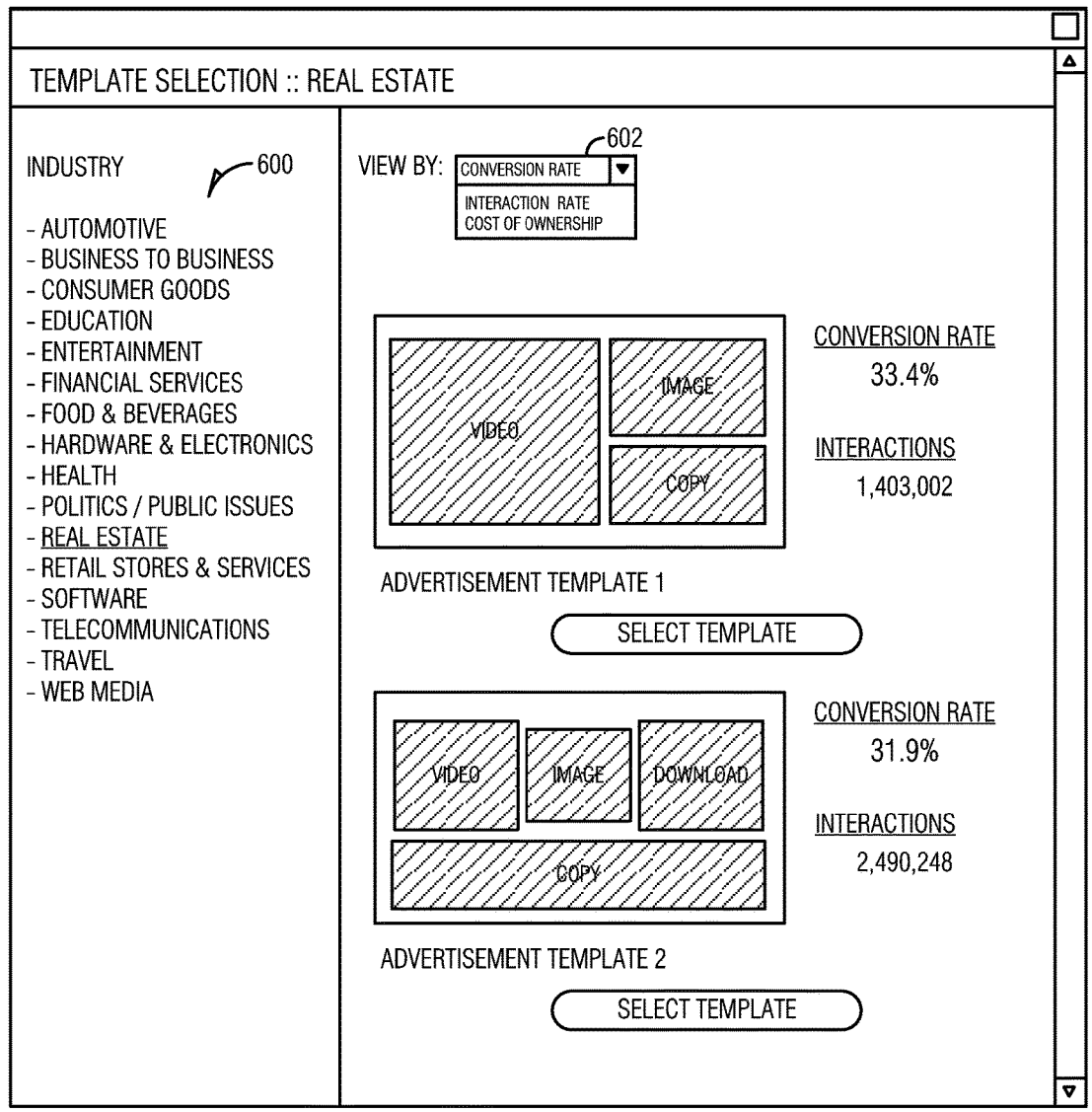

FIG. 6 illustrates an advertisement template selection user interface, according to an example embodiment. Advertisement templates may be associated with a particular group, such as an industry. For example, some advertisement templates may be shown to be more or less effective for a particular audience. In the example user interface shown, the user is presented with a list of industries 600. When the user selects an industry (in this example, Real Estate), advertisement templates corresponding to the selected industry are displayed. In this example, two advertisement templates are displayed: Advertisement Template 1 and Advertisement Template 2. Although not shown in this example, it is understood that the advertisement templates may be labeled using descriptive names. The user may use a filter control 602 to view advertisement templates in order. In the example shown, the user may display advertisement templates sorted by conversion rate, insertion rate, or cost of ownership. Statistical information, performance information, or other general information may be displayed with each advertisement template. In addition, the advertisement templates may be displayed in a manner to illustrate the advertising layout, such as by using placeholder images.

The conversion rate is the percentage of viewers that interacted with the advertisement template. The interaction rate is the number of viewers who opened an advertisement based on the advertisement template, such as from a banner ad or a teaser ad. The cost of ownership is a cost based on the use of a template. The cost may be based on the average bid for convertible activities associated with the template for a historical period of time.

Some examples of components that may be included in a template are a video component, an image component, a copy component, a download component, a reservation component, and an information gathering component. A video component is used to present video controls and a video stream to a viewer. The video may be in various formats including, but not limited to, Adobe® Flash®, DivX® by DivX, Inc., XviD by XviD.org, Audio Video Interleave (.avi) by Microsoft®, Moving Picture Experts Group (MPEG) (e.g., .mpg and .mp3), and the like. The video may be in an interactive format, such as with Flash®, so that the user can navigate, control, or provide input to the video component.

An image component is used to present one or more images. The images may be static or animated (e.g., using animated GIF format). An animated image component differs from a video component in various ways, such as an animated image component does not include playback controls, but instead loops indefinitely. Also, an animated image is typically much smaller than a video and is loaded completely with a page instead of streamed concurrently with other page elements. Web browser settings, proxy settings, and other configurations may alter the behavior of video or animated images.

A copy component is used to provide text copy. The text copy may be formatted using textual markups, such as underlining, bold font, font face, or font sizes.

A download component is used by a user to initiate a download. The downloaded item may include various contents and be in various formats. For example, a download component may be used to initiate a download of a restaurant's menu in Adobe® Portable Document Format (PDF) format. In other example, the download component may be used to initiate downloads of any electronic file or file type, including but not limited to, video, images, documents, music, audio files, compressed archives, executable files, applications, application libraries, and operating system files (e.g., video driver files, fonts, or the like).

A reservation component is used to reserve or "book" a resource. The resource may include anything, such as a dinner table, a rental car, an airplane ticket, a hotel room, ice time at an ice arena, or a library book. The reservation component may include interactive controls to search for an available resource and provide information to reserve the resource. For example, to reserve a table for dinner, a calendar interface may be presented to the user with previously-booked time slots blocked out. Should the user find a time slot to reserve, the user may be provided with one or more controls to provide information to reserve the time slot for the user. For example, the user may provide a telephone number, an email address, a username, a first and last name, or other identifying indicia to allow the restaurant to contact the user and confirm the reservation or authenticate the reservation when the user appears for dinner.

An information gathering component is used to obtain information from the viewing user. Information may include an email address, a name, a mailing address, a business name, a telephone number, or the like. The information gathering component may include one or more user interface controls, such as text input fields, to capture such information. The information may be used for various purposes, such as to subscribe the user to a publication or add the user to a public petition.

Figure 7:
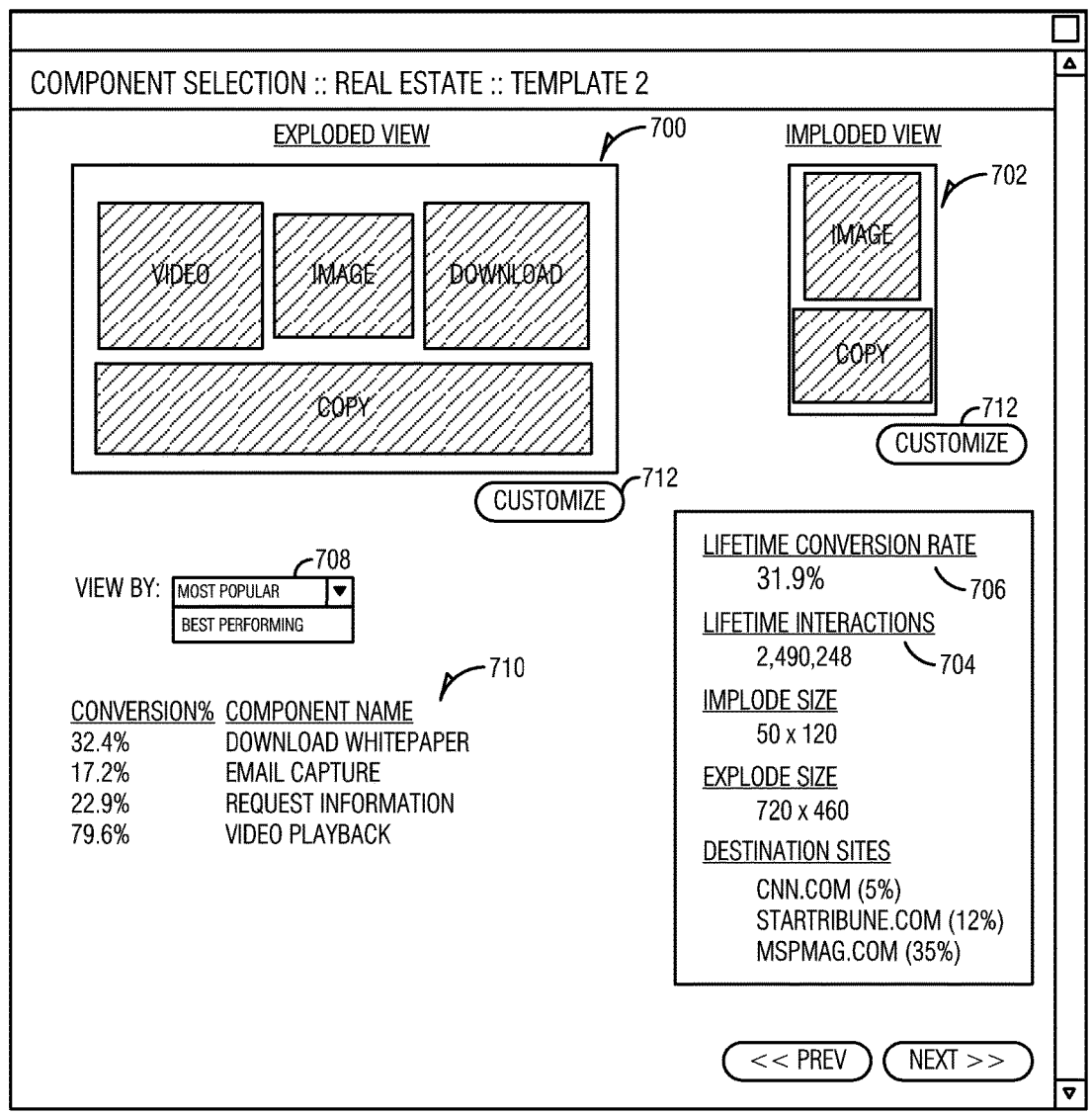

FIG. 7 illustrates an advertisement component selection user interface, according to an example embodiment. In the example illustrated in FIG. 7, the user has selected the advertisement template "Advertisement Template 2" from the previous user interface (FIG. 6). The user interface in FIG. 7 includes an advertisement template for an exploded view 700 and an advertisement template for an imploded view 702. The imploded view can be used on web pages to unobtrusively present the advertiser. In this case, because of the orientation of the advertising template for an imploded view 702, the imploded advertisement may be best used in a right or left column, for example. When a user interacts with the imploded view, a larger advertisement is presented using the template for an exploded view 700. This interaction is captured and aggregated in the lifetime interactions metric 704. Similarly, when a user activates any of the convertible components in the exploded or imploded view, the activity is captured and aggregated with the lifetime conversion rate metric 706. In an example embodiment, the imploded view comprises text and the exploded view is a larger advertisement, such as that presented in FIG. 7 at 700. Using such a mechanism may be useful when presenting advertisements in a listing, such as a search result or a directory. Other information is provided describing the sizes of the imploded view and exploded view (in pixels) and also some historical use of the advertising, namely the destinations of the advertisements. In addition, the user interface includes a filter control 708 to filter available components 710. The available components 710 can include at least the components that are used in the selected advertisement templates (imploded view 702 and exploded view 700). The available components listing may also include other components, which the user may add to a template by using the appropriate customize control 712.

Figure 8:
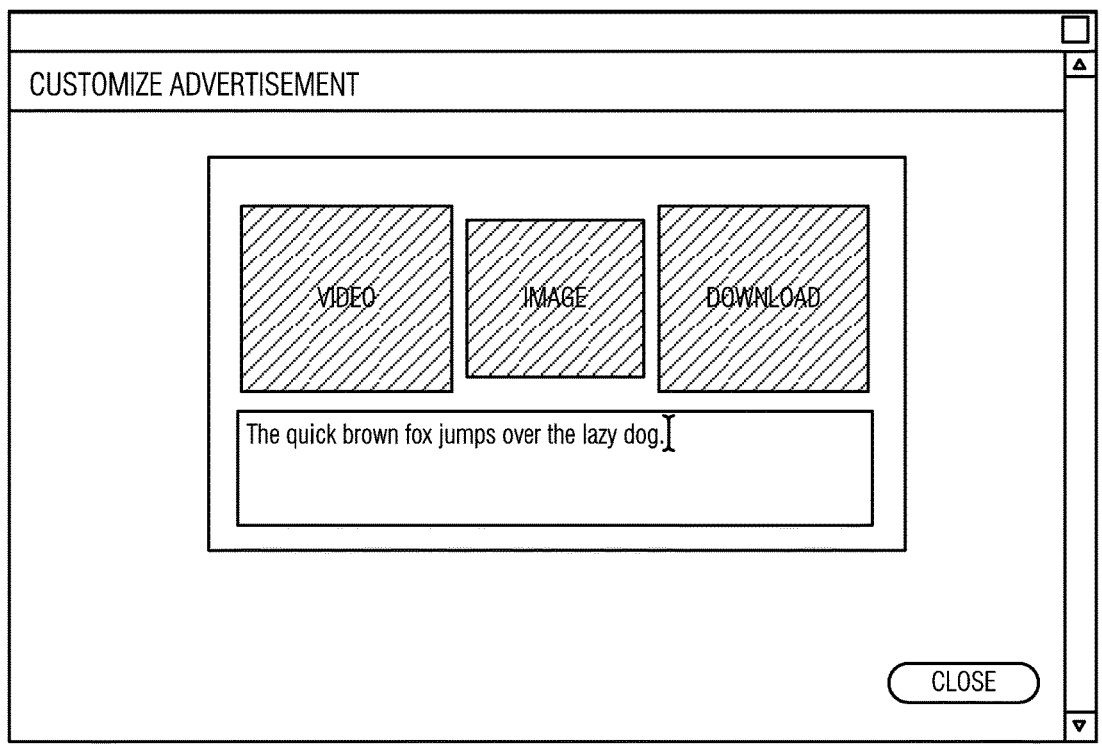

FIG. 8 illustrates an advertisement customization user interface, according to an example embodiment. The user interface illustrated in FIG. 8 is the result of the user activating the customize control 712 for the exploded view advertisement template 700. In the user interface, the user may add copy, configure components, arrange components, add new components, remove components, resize component frames, or perform other modifications to an advertisement template. For example, using contextual menus, the user may access available components to insert into the template or configuration options for components that are already present in the template. In an embodiment, these modifications are tracked to ensure consistency and accuracy when computing effectiveness of advertisement templates or advertisement components at a later time.

FIG. 9 illustrates an advertisement bidding user interface, according to an example embodiment. After the advertisement has been constructed (e.g., the template has been populated and revised to a desired form), the user may then indicate a bid for each of the components' convertible activities. In the example embodiment illustrated, the user may indicate a different bid for each interactive component's convertible activity. In other example embodiments, the user may be presented with controls to group two or more components together and indicate a bid for a cost per conversion of a convertible activity for any of the grouped components. For example, a user may indicate a $0.50 bid to be used for all convertible activities associated with the components used in a template. In another example embodiment, the user is presented with a single entry field for the bid for cost per conversion, which is then used for any convertible activities available via the components used. In addition, in an example embodiment, the user may indicate a bid for a reservation rate.

Machine Architecture

Figure 10:
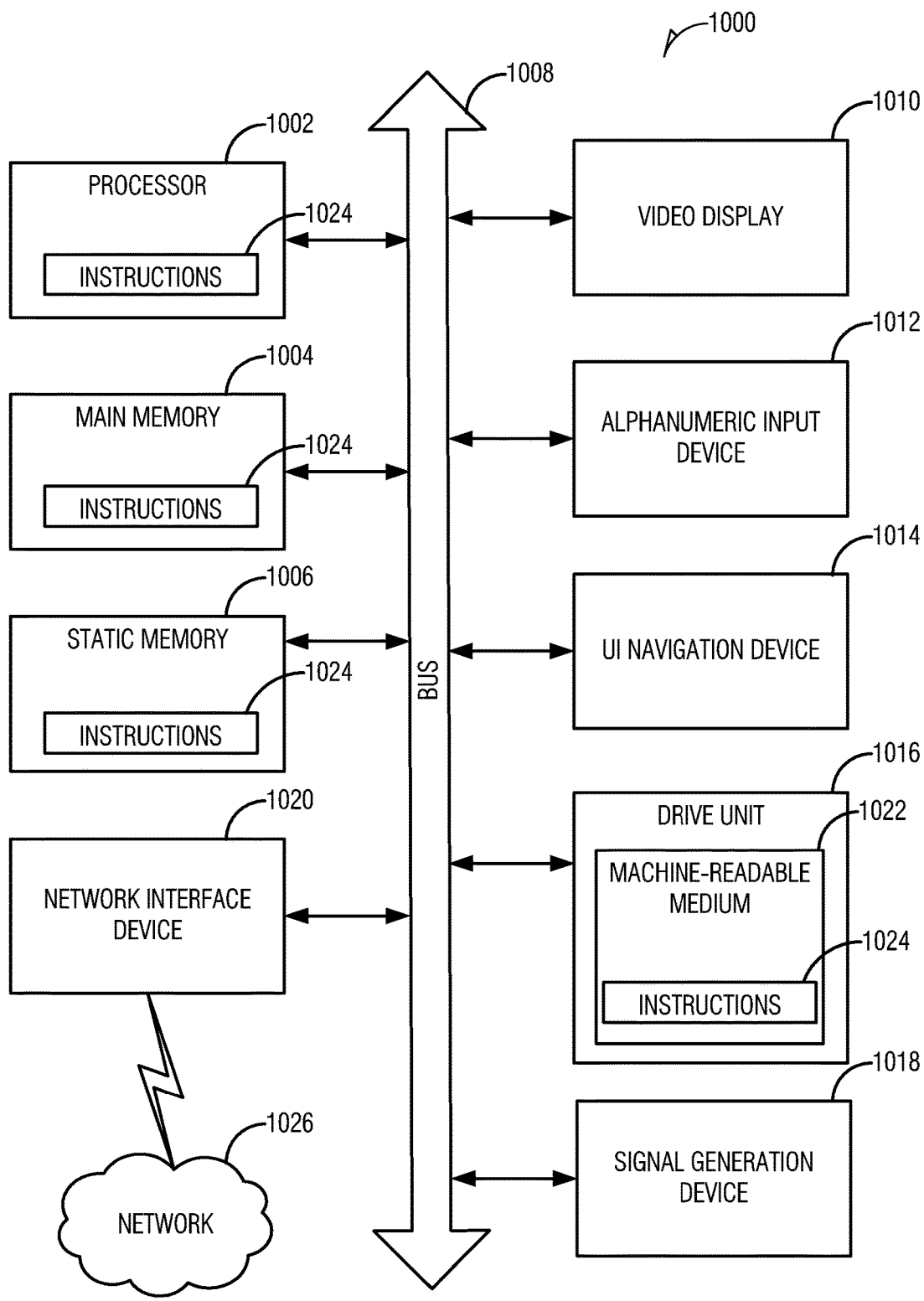
FIG. 10 shows a diagrammatic representation of a machine in the form of a computer system within which a set of instructions for causing the machine to perform any one or more of the methodologies discussed herein may be executed, according to an example embodiment.

FIG. 10 shows a diagrammatic representation of machine in the example form of a computer system 1000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions 1024 (e.g., software) embodying any one or more of the methodologies or functions described herein. The software instructions 1024 may also reside, completely or at least partially, within the main memory 1004 and/or within the processor 1002 during execution thereof by the computer system 1000, the main memory 1004 and the processor 1002 also constituting machine-readable media.

The software instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, tangible media, such as solid-state memories, optical, and magnetic media.

Thus, a method and system to manage advertisements has been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   storing, by a content delivery network associated with an ad server, a copy of an advertisement file associated with an advertisement;
   receiving, by the ad server, a request from a publisher site to present the advertisement;
   transmitting, by the ad server, a universal resource locator associated with an advertisement location to the publisher site in response to receiving the request from the publisher site;
   transmitting, by the content delivery network associated with the ad server, the advertisement including at least one component to the publisher site using the universal resource locator, wherein the content delivery network reduces latency of advertisement delivery;
   receiving, by the ad server, usage data comprising information indicative of a tracked user interaction with the at least one component of the advertisement, a user action taken during interaction with the advertisement, an identification of the at least one component of the advertisement that was used, and where the advertisement was placed;
   calculating, by the ad server, an aggregate value based on different values associated with components used over a determined period of time;
   charging, by the ad server, a fee to an advertiser according to the calculated aggregate value associated with the advertisement;
   distributing, by the ad server, a portion of an advertising revenue associated with the fee to a publisher associated with the publisher site and a portion of the advertising revenue to a developer associated with the advertisement.

2. The method of claim 1, wherein use of the at least one component comprises:
   receiving a user command from a user, the user command comprising a command to begin playback of a video related to the advertisement; and
   presenting the video to the user within the advertisement.

3. The method of claim 1, wherein use of the at least one component comprises:
   receiving, from a user, a request to download a file; and
   in response to the request, initiating a download of the file.

4. The method of claim 1, wherein use of the at least one component comprises:
   receiving contact information from a user; and
   using the contact information to subscribe the user to an information feed.

5. The method of claim 4, wherein the contact information is in a form of an email address.

6. The method of claim 1, wherein use of the at least one component comprises:
   receiving identifying information from a user;
   receiving a reservation request from the user, the reservation request to reserve a resource; and
   using the identifying information to reserve the resource based on the reservation request.

7. The method of claim 6, wherein the reservation request includes a dinner reservation and the resource includes a dining time slot.

8. The method of claim 1, further comprising:
   determining an advertising cost;
   collecting the advertising cost as advertising revenue; and
   distributing at least a portion of the advertising revenue to a publisher that presents the advertisement.

9. A system comprising:
a memory; and
a processing system, the processing system coupled to the memory, and the processing system configured to:
store at a content delivery network associated with an the processing system, a copy of an advertisement file associated with an advertisement;
receive a request from a publisher site to present the advertisement;
transmit a universal resource locator associated with an advertisement location to the publisher site in response to receiving the request from the publisher site;
transmit from the content delivery network associated with the processing system, the advertisement including at least one component to the publisher site using the universal resource locator, wherein the content delivery network reduces latency of advertisement delivery;
receive usage data comprising information indicative of a tracked user interaction with the at least one component of the advertisement, a user action taken during interaction with the advertisement, an identification of the at least one component of the advertisement that was used and where the advertisement was placed;
calculate an aggregate value based on different values associated with components used over a determined period of time;
charge a fee to an advertiser according to the calculated aggregate value associated with the advertisement; and
distribute a portion of an advertising revenue associated with the fee to a publisher associated with the publisher site and a portion of the advertising revenue to a developer associated with the advertisement.

10. The system of claim 9, wherein the tracked user interaction of the at least one component comprises:
receiving a user command from a user, the user command comprising a command to begin playback of a video related to the advertisement; and
presenting the video to the user within the advertisement.

11. The system of claim 9, wherein the tracked user interaction of the at least one component comprises:
receiving, from a user, a request to download a file; and
in response to the request, initiating a download of the file.

12. The system of claim 9, wherein the tracked user interaction of the at least one component comprises:
receiving contact information from a user; and
using the contact information to subscribe the user to an information feed.

13. The system of claim 9, wherein the tracked user interaction of the at least one component comprises:
receiving identifying information from a user;
receiving a reservation request from the user of the plurality of users, the reservation request to reserve a resource; and
using the identifying information to reserve the resource based on the reservation request.

14. A non-transitory computer-readable medium including instructions, which when executed by a computer, cause the computer to:
store, by a content delivery network associated with an ad server, a copy of an advertisement file associated with an advertisement;
receive, by the ad server, a request from a publisher site to present the advertisement;
transmit, by the ad server, a universal resource locator associated with an advertisement location to the publisher site in response to receiving the request from the publisher site;
transmit, by the content delivery network associated with the ad server, the advertisement including at least one component to the publisher site using the universal resource locator, wherein the content delivery network reduces latency of advertisement delivery;
receive, by the ad server, usage data comprising information indicative of a tracked user interaction with the at least one component of the advertisement, a user action taken during interaction with the advertisement, an identification of the at least one component of the advertisement that was used, and where the advertisement was placed;
calculate, by the ad server, an aggregate value based on different values associated with components used over a determined period of time;
charge, by the ad server, a fee to an advertiser according to the calculated aggregate value associated with the advertisement;
distribute, by the ad server, a portion of an advertising revenue associated with the fee to a publisher associated with the publisher site and a portion of the advertising revenue to a developer associated with the advertisement.

* * * * *